United States Patent [19]

Henry et al.

[11] Patent Number: 5,752,015
[45] Date of Patent: May 12, 1998

[54] METHOD AND APPARATUS FOR REPETITIVE EXECUTION OF STRING INSTRUCTIONS WITHOUT BRANCH OR LOOP MICROINSTRUCTIONS

[75] Inventors: Glenn Henry; Terry Parks, both of Austin, Tex.

[73] Assignee: Integrated Device Technology, Inc., Santa Clara, Calif.

[21] Appl. No.: 623,657

[22] Filed: Mar. 29, 1996

[51] Int. Cl.$^6$ .................................................. G06F 9/30
[52] U.S. Cl. .................................. 395/588; 395/595
[58] Field of Search ........................ 395/387, 588, 395/590, 595

[56] References Cited

U.S. PATENT DOCUMENTS

| | | | |
|---|---|---|---|
| 4,449,184 | 5/1984 | Pohlman, III et al. | 395/250 |
| 4,521,858 | 6/1985 | Kraemer et al. | 395/421.05 |
| 4,652,997 | 3/1987 | Kloker | 395/588 |
| 4,792,892 | 12/1988 | Mary et al. | 395/588 |
| 5,404,473 | 4/1995 | Papworth et al. | 395/588 |
| 5,507,027 | 4/1996 | Kawamoto | 395/588 |

*Primary Examiner*—Parshotam S. Lall
*Assistant Examiner*—Viet Vu
*Attorney, Agent, or Firm*—James W. Huffman

[57] ABSTRACT

An apparatus and method for improving the execution of string instructions is provided. The apparatus includes a translator which repetitively generates a micro instruction sequence applicable to the particular string operation to be performed, and an execution unit for executing the micro instruction sequence. In addition, a counter is provided to hold a count value corresponding to the number of times the micro instruction sequence is to be executed, and is decremented each time the sequence is executed. The translator continues to generate the micro instruction sequence until receiving a signal from a counter which indicates that all of the string has been operated upon. In addition, the execution unit receives the signal from the counter and tests subsequent micro instructions to determine whether they are associated with string instructions. If so, the execution unit performs NOPs in place of those micro instructions.

9 Claims, 6 Drawing Sheets

FIG. 2 (Prior Art)

Pipeline flow for move string instruction (MOVS)   CX=3

| 214 Cycle | 202 Fetch | 204 Translator Decode | 206 Register | 208 Address | 210 Execute | 212 Write Back | |
|---|---|---|---|---|---|---|---|
| 1 | REP MOVS | X | X | X | X | X | |
| 2 | NEXT | REP MOVS | X | X | X | X | |
| 3 | X | NEXT | Load AX,[SI] | X | X | X | |
| 4 | | X | Store [DI],AX | Load AX,[SI] | X | X | |
| 5 | | | DEC CX | Store [DI],AX | Load AX,[SI] | X | |
| 6 | | | JNZ | DEC CX | Store [DI],AX | Load AX,[SI] | |
| 7 | | | Load AX,[SI] | JNZ | DEC CX | Store [DI],AX | |
| 8 | | | Store [DI],AX | Load AX,[SI] | JNZ | DEC CX | |
| 9 | | | DEC CX | Store [DI],AX | Load AX,[SI] | JNZ | |
| 10 | | | JNZ | DEC CX | Store [DI],AX | Load AX,[SI] | |
| 11 | | | Load AX,[SI] | JNZ | DEC CX | Store [DI],AX | 3 Moves / |
| 12 | | | Store [DI],AX | Load AX,[SI] | JNZ | DEC CX | 12 Clocks |
| 13 | | | DEC CX | Store [DI],AX | Load AX,[SI] | JNZ | |
| 14 | | | JNZ | DEC CX | Store [DI],AX | Load AX,[SI] | |
| 15 | | | NEXT | JNZ | DEC CX | Store [DI],AX | |
| 16 | | | X | NEXT | JNZ | DEC CX | |
| 17 | | | | X | NEXT | JNZ | |
| 18 | | | | | X | NEXT | |
| 19 | | | | | | X | |

FIG. 3 (Prior Art)

Pipeline flow for move string instruction (MOVS)  CX=3

| 314 Cycle | 302 Fetch | 304 Translator Decode | 306 Register | 308 Address | 310 Execute | 312 Write Back | |
|---|---|---|---|---|---|---|---|
| 1 | REP MOVS | X | X | X | X | X | |
| 2 | NEXT | REP MOVS | X | X | X | X | |
| 3 | X | NEXT | Load AX,[SI] | X | X | X | |
| 4 | | X | Store [DI],AX | Load AX,[SI] | X | X | |
| 5 | | | JZ | Store [DI],AX | Load AX,[SI] | X | |
| 6 | | | Load AX,[SI] | JZ | Store [DI],AX | Load AX,[SI] | |
| 7 | | | Store [DI],AX | Load AX,[SI] | JZ | Store [DI],AX | |
| 8 | | | JZ | Store [DI],AX | Load AX,[SI] | JZ | |
| 9 | | | Load AX,[SI] | JZ | Store [DI],AX | Load AX,[SI] | 3 Moves / |
| 10 | | | Store [DI],AX | Load AX,[SI] | JZ | Store [DI],AX | 9 Clocks |
| 11 | | | JZ | Store [DI],AX | Load AX,[SI] | JZ | |
| 12 | | | NEXT | JZ | Store [DI],AX | Load AX,[SI] | |
| 13 | | | X | NEXT | JZ | Store [DI],AX | |
| 14 | | | | X | NEXT | JZ | |
| 15 | | | | | X | NEXT | |
| 16 | | | | | | X | |

FIG. 6

Pipeline flow for move string instruction (MOVS)   CX=3

| 614<br>Cycle | 602<br>Fetch | 604<br>Translator<br>Decode | 606<br>Register | 608<br>Address | 610<br>Execute | 612<br>Write Back | |
|---|---|---|---|---|---|---|---|
| 1 | REP MOVS | X | X | X | X | X | |
| 2 | NEXT | REP MOVS | X | X | X | X | |
| 3 | X | NEXT | Load AX,[SI] | X | X | X | |
| 4 |   | X | Store [DI],AX | Load AX,[SI] | X | X | |
| 5 |   |   | Load AX,[SI] | Store [DI],AX | Load AX,[SI] | X | |
| 6 |   |   | Store [DI],AX | Load AX,[SI] | Store [DI],AX | Load AX,[SI] | |
| 7 |   |   | Load AX,[SI] | Store [DI],AX | Load AX,[SI] | Store [DI],AX | |
| 8 |   |   | Store [DI],AX | Load AX,[SI] | Store [DI],AX | Load AX,[SI] | |
| 9 |   |   | Load AX,[SI] | Store [DI],AX | Load AX,[SI] | Store [DI],AX | 3 Moves |
| 10 |   |   | Store [DI],AX | Load AX,[SI] | Store [DI],AX | Load AX,[SI] | 8 Clocks |
| 11 |   |   | NEXT | Store [DI],AX | NOP | Store [DI],AX | |
| 12 |   |   |   | NEXT | NOP | NOP | |
| 13 |   |   |   | X | NEXT | NOP | |
| 14 |   |   |   |   | X | NEXT | |
| 15 |   |   |   |   |   | X | |

METHOD AND APPARATUS FOR REPETITIVE EXECUTION OF STRING INSTRUCTIONS WITHOUT BRANCH OR LOOP MICROINSTRUCTIONS

BACKGROUND

1. Field of the Invention

This invention relates in general to the field of instruction execution in computer systems, and more particularly to a method and apparatus for improving the performance of executing string instructions.

2. Description of the Related Art

Byte and string manipulation has always been important in computer processing. A primary application is in the area of text processing, which is the management of sequences of bytes that contain the alphanumeric codes for characters, i.e., character strings. In text processing it is essential to have program sequences for moving and comparing character strings, and for inserting strings into and deleting them from other strings. In addition, it is often necessary to search a string for a given substring or to replace a substring with a different substring. Other applications requiring string manipulation include array processing, code conversion, and searching for keys in a file system.

To better understand the program sequence required to perform string manipulation, a number of examples will be provided below which discuss prior art methods of moving a string from one location in memory to another. For convenience, the examples will utilize the nomenclature of an x86 microprocessor. It should be appreciated by one skilled in the art that the use of the x86 registers and macro instructions are for illustrative purposes only. Other processors or architectures may be easily substituted for this illustration.

An x86 microprocessor provides a number of registers which are used to calculate: 1) the address of a byte or word which will be manipulated, i.e., the source string; 2) the address of a byte or word to which the source string will be moved, i.e., the destination string; and 3) the number of times the string operation must be repeated to manipulate the entire string. In a protected mode memory model, the source address for a string is found by adding the contents of the data segment base register DS with that of the source index register SI. One skilled in the art understands that the use of DS may be explicitly overridden by specifying another segment register as the base. The destination address for a string is found by adding the contents of the extra segment base register ES to the contents of the destination index register DI. Once a string operation is performed at a first source/destination address, the contents of SI and DI can be incremented or decremented, as specified by the programmer, and the operation repeated. By placing the string operation and increment/decrement steps within a loop, an entire string can be manipulated or transferred. The number of times the string instruction must be repeated is stored in general purpose register CX.

Referring to FIG. 1, a memory map 100 is shown. The memory map 100 contains a number of different memory locations 102, 104 for storing data. Each of these memory locations 102, 104 have addresses 106 which identify, much like a postal address, the location in memory 100 that is being referred to. Within the memory map 100 is a string 108 of data which contains a plurality of bytes or words 110. In the present figure, the string 108 will be moved from a source location 112 to a destination location 114.

The address of the source location 112 is determined by adding the contents of a base address register DS to the contents of an index register SI. The address of the destination location 114 is determined by adding the contents of a base address register ES to the contents of an index register DI. By moving a word from location DS+SI to location ES+DI, then incrementing the contents of SI and DI, and repeating the move and increment steps, all of the string 108 will be moved from location 112 to location 114.

An x86 macro instruction program sequence which performs the string move operation illustrated in FIG. 1 is shown below.

TABLE I

|  | MOV SI,A | ;where A is offset of ;source |
|---|---|---|
|  | MOV DI,B | ;where B is offset of ;destination |
|  | MOV CX,L | ;where L is length of ;string |
| AGAIN | MOV AX, [SI] | ;move word from source |
|  | MOV [DI],AX | ;move word to destination |
|  | DEC CX | ;decrement counter |
|  | JNZ AGAIN | ;continue loop until length is zero |

In the above illustration, the start address of the source and destination are loaded into the SI and DI registers. In addition, the length of the string is loaded into the CX register. At this point, a program loop begins which moves a string, one word at a time, from a source address to a destination address. While not shown, internal to the microprocessor is logic which automatically increments or decrements the SI and DI registers after each move operation. After the moves have occurred, the CX register is decremented. At this point a jump if not zero instruction JNZ is executed. This instruction branches back to the start of the loop unless CX reaches zero. When the CX register reaches zero, a zero flag is set which is tested by the JNZ instruction. If zero, operation leaves the loop and continues to the next instruction.

While the above program sequence can perform a move string operation, it is clumsy to write, and time consuming for the processor. An abbreviated form of the move instruction has been provided which shortens the code sequence required for string operations. This move instruction has the primitive MOVS for move string. The MOVS primitive replaces the instructions: MOV AX, [SI]; MOV [DI],AX; and DEC CX. Additionally, a repeat prefix REP may be placed with the MOVS instruction to indicate that the instruction should repeat until the CX register equals zero. The REP prefix replaces the JNZ portion of the macro instruction sequence. Thus, the above program sequence may be replaced with the following:

TABLE II

|  | MOV SI,A | ;where A is offset of source |
|---|---|---|
|  | MOV DI,B | ;where B is offset of destination |
|  | MOV CX,L | ;where L is length of string |
| REP | MOVS | ;repeat move string operation until done | where the offsets and string length are first initialized, and then the move string operation is written with a single primitive MOVS having a prefix REP.

While the above sequence illustrates a simplified program for manipulating strings, the operation speed of the move string sequence has not been improved. Internally, the microprocessor is still performing the same instruction sequence as shown in Table I. This can be illustrated by referring to FIG. 2.

FIG. 2 provides a pipeline flow diagram 200 for a move string instruction in a five stage microprocessor. The elements of the stages of the microprocessor include: 1) a fetch instruction 202; a translate/decode instruction 204; a register 206; an address 208; an execute 210; and a write back 212. The stages provided are for illustrative purposes only. It should be understood that in other processors, some of these elements may be combined, or the order of the elements may be slightly altered. For a general background on pipeline processors, see *Computer Architecture: A Quantitative Approach, by John L. Hennessy and David A. Patterson,* 2nd ed. In addition to the processor elements 202–212, a processor cycle column 214 is shown. The cycle 214 provides a relative time measurement for the flow of instructions through the pipeline.

At clock cycle 1, the REP MOVS instruction is fetched. While not shown it is presumed that the index registers SI and DI have already been initialized. In addition, the CX register has been loaded with a value of 3, as an example. Following the REP MOVS instruction is an instruction NEXT which is provided to indicate that some other instruction outside of the string move follows. After NEXT is an X to indicate that other instructions beyond the present illustration occur. At clock cycle 2, the REP MOVS instruction has been fetched, and provided to an instruction buffer. At clock cycle 3, the REP MOVS instruction is translated into a micro instruction sequence which performs the function defined by REP MOVS. As stated above, the actions required internal to the microprocessor are not changed by REP MOVS, merely simplified from a programmer's viewpoint. The REP MOVS instruction is thus translated into the micro instruction sequence:

TABLE III

| Load AX, [SI] | ;load word from source |
| Store [DI],AX | ;store word to destination |
| Dec CX | ;test flag for zero |
| JNZ | ;if not zero, branch |

Each of the instructions in Table III are provided by the translator, or are provided by a control ROM, but each require a single clock cycle. Thus, at clock cycle 3, the Load AX, [SI] instruction proceeds to the register element 206. At clock cycle 4, the Load AX,[SI] instruction proceeds to the address element 208, and the Store [DI], AX instruction is provided to the register element 206. These instructions proceed down the pipeline until they leave the write back element 212. Following the Load and Store instructions is the JNZ instruction. It is typical for this instruction to require two clock cycles for execution. For example, during a first clock cycle, the CX register is decremented, and a flag is set indicating whether the CX register reached zero. During the second clock cycle the JNZ instruction tests the flag, which causes the processor to continue execution with the next instruction, or causes a jump to occur. In this illustration, the DEC CX instruction, and the JNZ instructions, are required at the end of every Load/Store operation. However, as shown in clock cycle 15, in the register element 206, after the 3rd Load/Store operation, the NEXT instruction occurs. This is because the CX register has been decremented to zero, and the loop is complete.

In the method for performing a move instruction described above, the processor was required to execute seventeen clock cycles to perform three moves. Six of the clock cycles were required for actually moving data, while the other six cycles were required for test and branch operations to continue the loop. Thus, 50% of the time associated with the move string operation is attributable to branch overhead. What should be clear from the above is that typical execution of string operations, such as the REP MOVS instruction requires significant overhead to perform the test/branch operation.

As a solution to the above overhead problem, one method utilizes a different form of test branch operation, jump if zero JZ, that only requires a single clock cycle for operation. This method is referred to as "unrolling the loop". Referring to FIG. 3, a pipeline diagram is shown which performs the same move string instruction as above, but utilizes the JZ instruction instead. For convenience, like elements in the stages have been labeled as in FIG. 2, as elements 302–314. In this instance, rather than having just 4 lines of micro instructions provided by a translator or control ROM, as in Table III, this program sequence is at least 9 lines long, but typically would be much longer. Thus, a long string of Load/Store/JZ micro instructions are provided to the register element 306 of the pipeline, and continue down until the CX register reaches zero. At this point, program execution branches to the NEXT instruction outside the Load/Store sequence. The goal of this program sequence is to sacrifice code efficiency for that of execution speed. But, although speed has been improved (three moves require just nine clocks), 33% of the cycle time is still required to execute the test/branch portion of the sequence.

A third solution to improving the processing speed of string instructions is illustrated in the flow chart 400 of FIG. 4. In this example, multiple move sequences are provided which reduce the overhead associated with long string operations. Referring to FIG. 4, the flow begins at block 402. Proceeding to decision block 404, a first test is performed to determine whether the length of the string move is greater than or equal to 8 words, i.e., is CX≧8? If the answer to the test is yes, then flow proceeds to block 406 where 8 back to back load/store operations occur. If the answer is no, then flow proceeds to decision block 408 to test whether the length of the string is greater than or equal to 4 words. If yes, flow proceeds to block 410 where 4 back to back load/store operations occur. If no, then flow proceeds to decision block 412. It is important to note that flow also proceeds from execution block 410 to decision block 412. Since flow will never arrive at block 410 until the length of the string is less than 8 words, as illustrated by blocks 404 and 406, the largest string length possible at decision block 412 is 3 words. Thus, whether arriving at block 412 from decision block 408 or block 410, decision block 412 tests to see if the length of the string is greater than or equal to two words. If yes, flow proceeds to execution block 414 where two back to back load/store operations occur. If no, flow proceeds to decision block 416. Flow also proceeds to block 416 from execution block 414. Decision block 416 tests to see whether the remaining length of the string is greater than or equal to 1 word. If no, then the string operation is over and is terminated at block 420. If yes, then flow proceeds to execution block 418 where a single load/store operation is performed. Flow then is terminated at block 420.

What has been shown with reference to FIG. 4 is a method for limiting the number of test/branch operations by providing multiple load/store sequences which can operate in batches based on the length of the string. However, what should be clear is that a number of test/branch operations are required, in this case 4 JNZ operations at a minimum, with an additional JNZ for every 8 words. It should be appreciated by one skilled in the art that the length chosen for the decision and execution blocks is for illustrative purposes only. Other values may be selected. In addition, other decision blocks having a greater test length may also be added. While the test/branch overhead for longer strings is improved over the 50% and 33% methods discussed above, string operations still require significant overhead for looping.

SUMMARY

For the foregoing reasons, there is a need for a method and apparatus for improving the execution performance of string operations that does not require significant test/branch overhead.

To address the above-detailed deficiencies, it is an object of the present invention to provide an apparatus and method for improving the execution speed of repetitive string instructions.

Accordingly, in the attainment of the aforementioned object, it is a feature of the present invention to provide a processing system for executing instructions, including string instructions, within a computing environment. The processing system includes an instruction memory, for storing string instructions, data memory, for storing data upon which the string instructions operate, a translator, connected to the instruction memory, for receiving string instructions from instruction memory and for generating a sequence of micro instructions for each of the string instructions. In addition, the processing system includes an execution unit, connected to the translator, for receiving the sequence of micro instructions from the translator, and for executing the micro instructions. The processing system further includes a counter, connected to the translator and to the execution unit, for storing a value associated with the number of times the sequence of micro instructions is to be executed for each of the string instructions, for counting the number of times the sequence of micro instructions is executed, and for providing a signal indicative that the counted number of times equals the stored number of times.

The present invention further contemplates a processing system, as mentioned above, where the instruction memory is a cache.

In addition, the present invention further contemplates a processing system, as mentioned above, where the string instructions include move string operations, compare string operations, and load string operations. Furthermore, it is contemplated that the string operations may include a repeat prefix indicating that the string instructions are to be repetitively executed.

A further feature of the present invention is to provide a processing system, as mentioned above, where the translator, upon receipt of the string instructions having a repeat prefix, repeatedly generates the sequence of micro instructions for the string instructions until receiving the signal from the counter.

An additional feature of the present invention is to provide a processing system, as recited above, where the sequence of micro instructions generated by the translator contain information indicating that the micro instructions are associated with string instructions. Such information may be contained within a control bit within the micro instructions. Furthermore, the execution unit includes string detection circuitry, connected to the translator, which detects whether micro instructions are associated with string instructions.

A further feature of the present invention is to provide a processing system, as mentioned above, where the execution unit is connected to the signal provided by the counter, and where, upon receipt of the signal from the counter, does not execute subsequent micro instructions associated with string instructions, at least until the signal changes. One aspect of this invention is to have the execution unit turn the subsequent micro instructions into NOPs (no operation instructions).

A further feature of the present invention is to provide a processing system, as mentioned above, which includes a register file, connected to the translator and to the execution unit, which stores values associated with the location of data upon which the string instructions operate. The register file includes a first register, for storing a first address associated with a location in the data memory which the sequence of micro instructions will use as a source, a second register, for storing a second address associated with a location in the data memory which the sequence of micro instructions will use as a destination, and a control register, for storing a value indicative of the number of times each of the sequence of micro instructions is to be executed.

A further feature of the present invention is to provide a processing system, as mentioned above, where the control register provides the indicative value to the counter prior to the execution of the micro instructions to be executed for each of the string instructions.

An advantage of the processing system, as mentioned above, is that the speed of execution for repetitive string instructions is improved because the typical test/branch operation at the end of each micro instruction sequence has been eliminated.

In another aspect of the present invention, it is a feature to provide a microprocessor for executing instructions, including macro string instructions, where the microprocessor includes an instruction cache, for storing instructions, including the macro string instructions, and a translator, connected to the instruction cache, for receiving the macro string instructions, and for translating each of the macro string instructions into a micro instruction sequence. In addition, the microprocessor includes a register file, connected to the translator, for storing addresses of data upon which the micro instruction sequence operates, an execution unit, connected to the translator and to the register file, for executing the micro instruction sequence, and a counter, connected to the translator, and to the execution unit, for storing a value associated with the number of times the micro instruction sequence is to be executed, for counting the number of times the sequence is executed, and for providing a signal indicative that the counted number of times equals the stored number of times.

In yet another aspect of the present invention, it is a feature to provide a computing system for executing repetitive string instructions, where the computing system includes an instruction cache, for storing the repetitive string instructions, a data memory, for storing data strings, and a translator, connected to the instruction cache, for receiving the repetitive string instructions, for translating each of the repetitive string instructions into a micro instruction sequence, and for repetitively generating the micro instruction sequence. The computing system also includes a register file, connected to the translator, where the register file includes a source register, for storing a first address associated with a location in the data memory where a source data string resides, a destination register, for storing a second address associated with a location in the data memory where a destination data string may be placed, and a control register, for storing a value indicative of the number of times each of the string instructions are to be executed. The computing system also includes an execution unit, connected to the translator and to the register file, for receiving the repetitively generated micro instruction sequence from the translator, and for executing the repetitive sequence, and a counter, connected to the translator, to the execution unit, and to the control register, for receiving the indicative value from the control register, for storing the value, for counting the number of times the micro instruction sequence is executed, and for providing a signal to the translator indicative that the counted number of times equals the stored value.

In one aspect of the present invention, the translator stops repetitively generating the micro instruction sequence upon receipt of the signal from the counter.

In another aspect of the present invention, the counter is also connected to the execution unit, and the execution unit stops executing the repetitive sequence upon receipt of the signal from the counter.

In yet another aspect of the present invention, it is a feature to provide a method for executing a repetitive string instruction in a processing environment having a translator and an execution unit. The method includes translating the repetitive string instruction into a micro instruction sequence, storing a value indicative of the number of times the micro instruction sequence is to be executed, repetitively generating the micro instruction sequence, executing the repetitively generated micro instruction sequence, counting the number of times said micro instruction sequence is executed, and when the counted number of times equals the stored number of times, stopping execution of a subsequent repetitively generated micro instruction sequence.

Additional features and advantages of the invention will be described hereinafter. Those skilled in the art should appreciate that they can readily use the disclosed conception and specific embodiment as a basis for designing or modifying other structures for carrying out the same purposes of the present invention.

DESCRIPTION OF THE DRAWINGS

These and other objects, features, and advantages of the present invention will become better understood with regard to the following description, and accompanying drawings where:

FIG. 2 is a pipeline diagram for a move string instruction implemented using a prior art method.

FIG. 3 is a pipeline diagram for a move string instruction implemented using an alternative prior art method.

FIG. 6 is a pipeline diagram illustrating a move string instruction implemented using the idea of the present invention.

DETAILED DESCRIPTION

Figure 1:
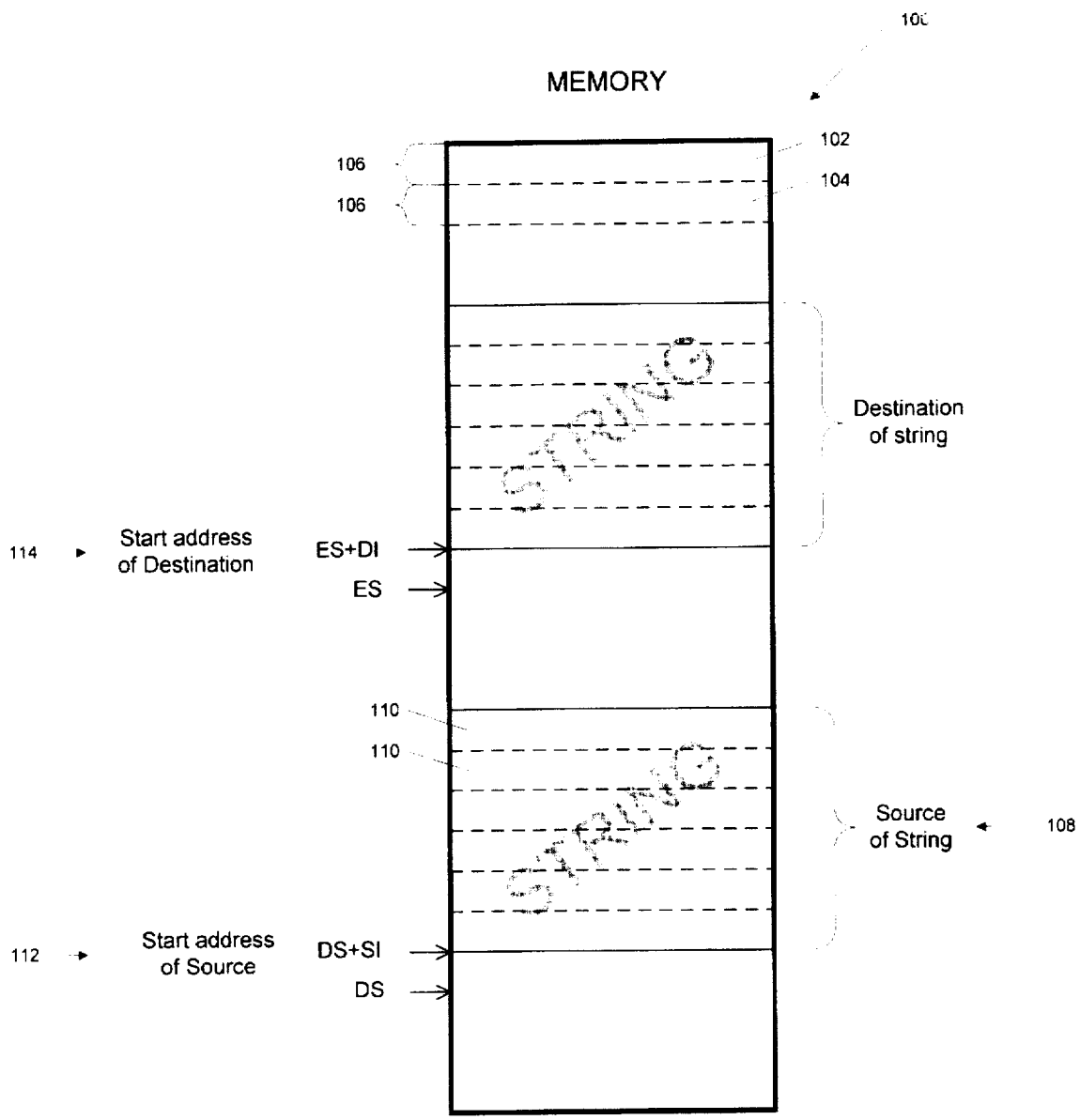
FIG. 1 is a memory map indicating source and destination addresses for blocks of data upon which strings operations may operate.
Figure 4:
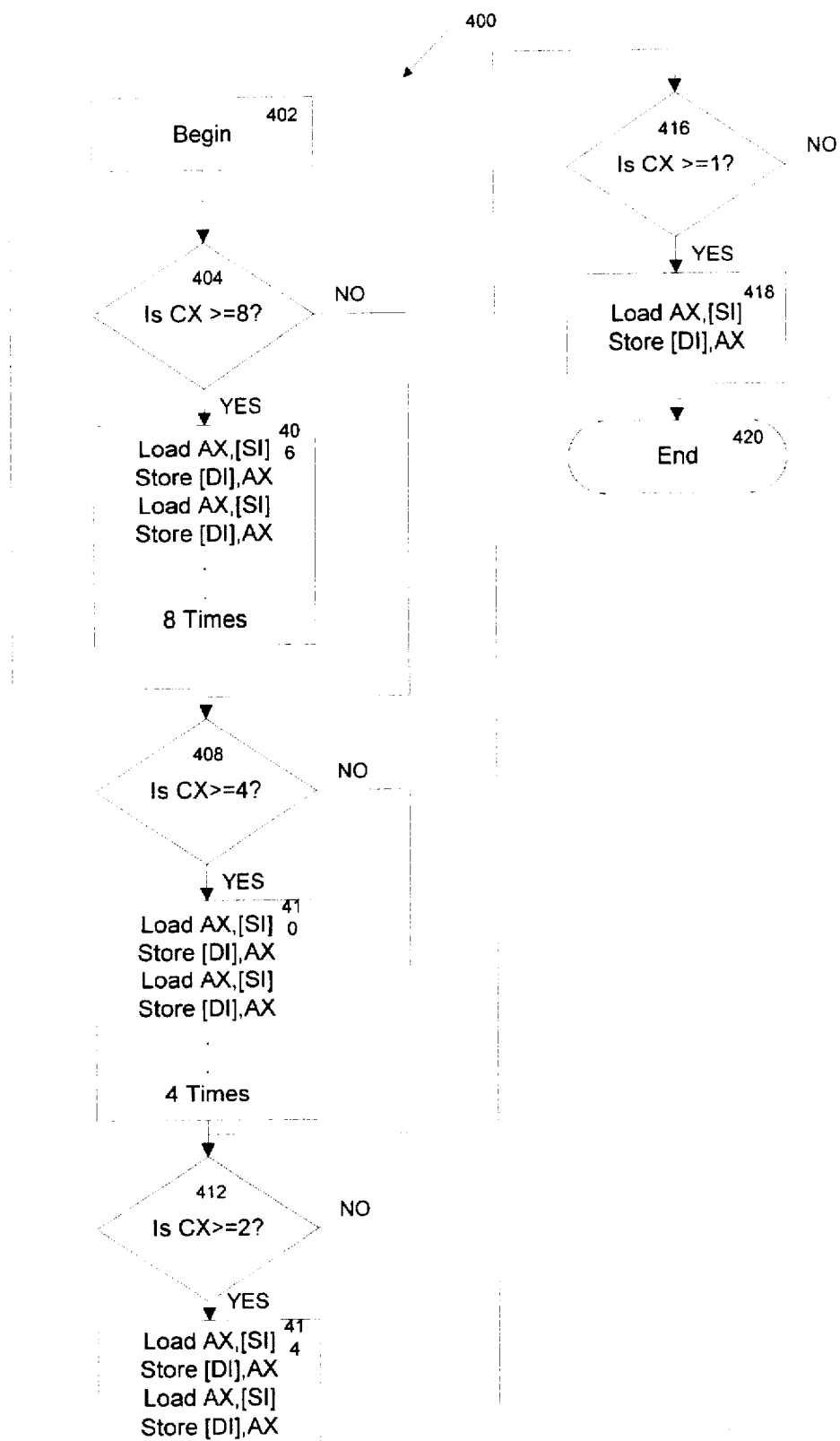
FIG. 4 is a flow chart illustrating a move string instruction implemented using yet another prior art method.
Figure 5:
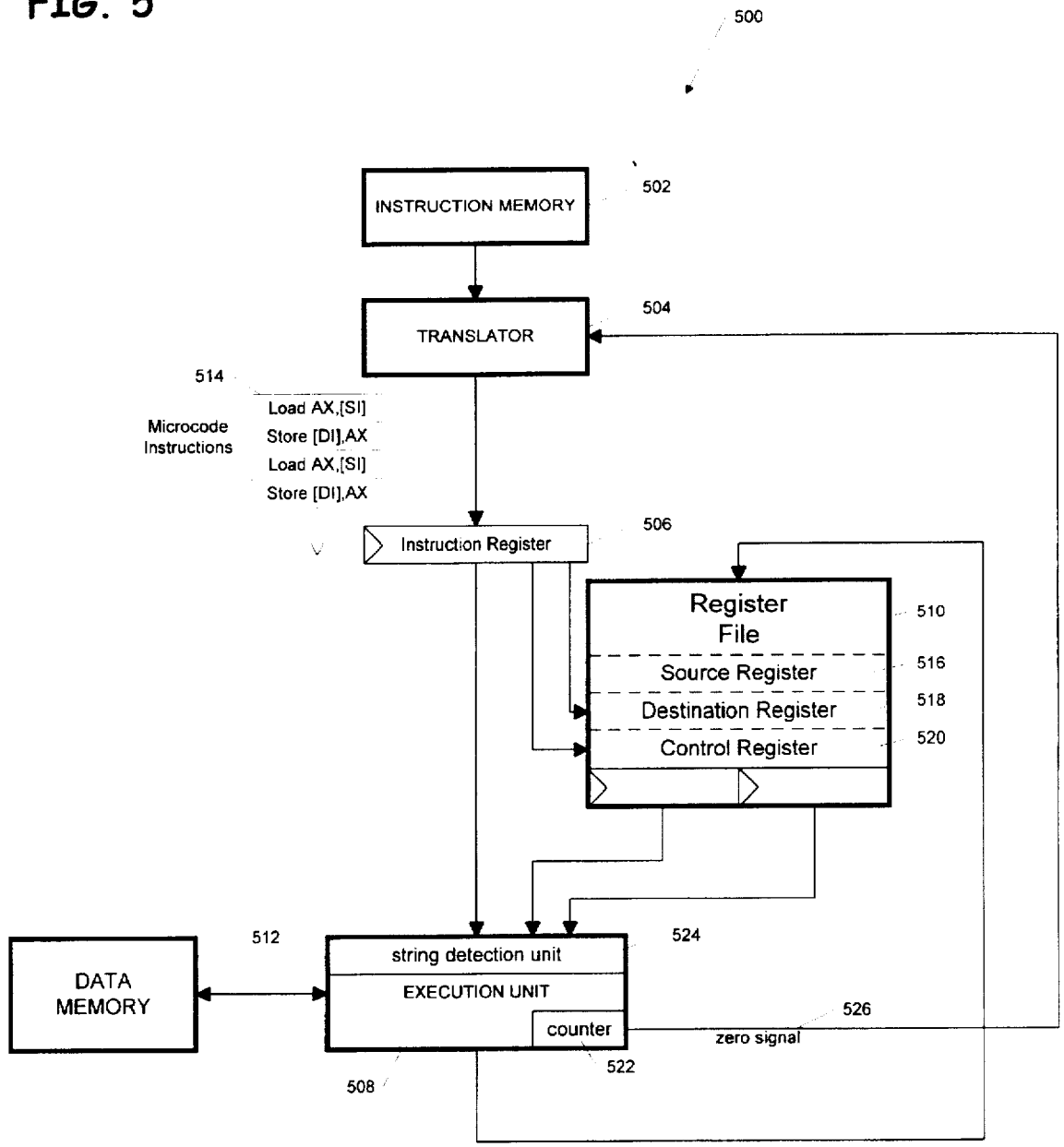
FIG. 5 is a schematic diagram of an apparatus which implements the present invention.

Referring to FIG. 5, a schematic diagram 500 is provided which illustrates an apparatus for implementing the improved execution of string instructions, according to the present invention. The diagram 500 includes an instruction memory 502 which is connected to a translator 504. The instruction memory 502 may be any type of storage typically accessed by a processor, such as DRAM or SRAM, or possibly a dedicated cache system, either external to a processor or within the processor. The translator 504 is shown connected to an instruction register 506 which delivers opcodes and operands to an execution unit 508, and to a register file 510.

The register file 510 provides temporary storage for data, and when accessed by the instruction register 506, can deliver the data to the execution unit 508. The register file 510 includes a number of registers including a source address register 516, a destination address register 518, and a general register 520. The general register 520 could be used as the CX register discussed above, for holding the value associated with the length of a particular string.

The execution unit 508 executes the instructions provided by the instruction register 506, and then writes the data back into either the register file 510, or into the data memory 512. The execution unit includes a counter 522 and a string detection unit 524. Attached to the counter 522 is a signal line 526 which is also connected to the translator 504. The signal line 526 is used to signal the translator that the counter has reached zero, as will be further discussed below.

One familiar with computer architecture will understand that other blocks may be provided to complete a modern processor. However, for ease of illustration, discussion will focus on those elements required to appreciate the novelty of the present invention.

The instruction memory 502 provides macro instructions (not shown) to the translator 504. The macro instructions may be similar to the REP MOVS instruction discussed above with reference to FIG.'s 2–4. The translator 504 identifies the macro instruction, and if the macro instruction is a string instruction, begins generating a string of micro instructions applicable to the macro string instruction. If the macro instruction is a MOVS, for example, the translator would generate a repetitive sequence of Load/Store micro instructions 514, ad infinitum. Prior to providing the repetitive sequence of micro instructions, the translator 504 issues a command to the register file 510 to have the value in the general register 520 delivered to the execution unit 508. The execution unit delivers the value in the general register 520 to the counter 522. Thus, if the length of the string has been stored in the general register 520 prior to beginning the macro string instruction, this value can be used by the counter 522 to count the number of times the micro instruction sequence should be executed by the execution unit 508.

To better illustrate the operation of the apparatus shown in FIG. 5, the reader is referred to the pipeline diagram 600 of FIG. 6. For convenience, like elements in the stages have been labeled as in FIGS. 2 & 3, as elements 602–614. FIG. 6 illustrates the pipeline flow of a REP MOVS macro instruction executed by the apparatus of FIG. 5. At clock cycle 1, the REP MOVS instruction is fetched from the instruction memory 502 and provided to the translator 504. At clock cycle 2, the translator decodes the macro instruction and tells the register file 510 to deliver the value in general register 520 to the execution unit 508. The execution unit 508 then delivers this value to the counter 522. At the end of clock cycle 2, the first micro instruction of the string sequence is stored in the instruction register 506. During subsequent clock cycles, the micro instruction sequence associated with the string macro instruction is repeatedly generated by the translator 504.

During clock cycles 3–10 the translator has repeatedly generated the load/store micro instruction sequence to the instruction register. These instructions proceed down the pipeline for execution by the execution unit 508. As each load/store micro instruction sequence is completed, the counter 522 is decremented.

Execution of the repetitively generated load/store micro instruction sequence continues until the counter 522 reaches zero. At this point, a signal is generated by the counter to both the translator 504, via the signal line 526, and to the execution unit 508, indicating that no more micro instructions associated with the string operation are to be either generated, or executed. The translator 504 receives the signal from the counter 522, and provides the NEXT instruction to the instruction register during the next cycle.

Up to this point, no overhead has been needed by the apparatus of the present invention in executing the macro string operation, other than the actual load and store operations. This is true whether the string requiring manipulation was 8 or 1000 words in length. No test/branch overhead has been required. However, what remains in the pipeline are the load/store micro instructions which have already been provided by the translator 504, but not yet executed by the execution unit 508.

After receiving the counter equals zero signal from the counter 522, the execution unit utilizes the string detection unit 524 to determine whether subsequent micro instructions are associated with a macro string instruction. One embodiment of the present invention sets a control bit in the opcode of string instructions to identify the instruction as appropriate for string operations. However, other methods may be used to identify particular micro instructions, or micro instruction sequences, as associated with string operations. If after receiving a counter equals zero signal from the counter 522, the string detection unit 524 identifies a micro instruction as associated with a string operation, the execution unit is notified. The execution unit then performs a no operation instruction (NOP) rather than executing the micro instruction.

Thus, the present invention, upon receipt of a macro string instruction from the instruction memory 502, repeatedly generates a micro instruction sequence applicable to the macro instruction, until receiving a counter equals zero signal from the counter 522. The execution unit 508, upon receiving the counter equals zero signal, detects whether remaining micro instructions in the pipeline are associated with a macro string instruction, and if so, performs NOP's in place of the micro instructions. Depending on the number of stages between the translator and the execution unit, i.e., stages which contain string micro instructions generated by the translator, but not executed after the counter reaches zero, the overhead associated with string operations can vary. In the present illustration, the overhead is equal to 2 clock cycles. Thus, the apparatus and method of the present invention has improved the processing speed of string instructions by reducing the overhead associated with execution of the instructions to a fixed constant, typically 2–3 cycles. This is in contrast to the other methods discussed above which require an overhead which is a relative percentage of the number of bytes or words to be operated upon.

Although the present invention has been described in considerable detail with reference to certain preferred versions thereof, other versions are possible. For example, the micro instruction sequence 514 may be provided by a control ROM upon command by the translator 504. In addition, the counter 522 may not reside within the execution unit 508, but may stand alone between the translator and the execution unit 508. It is possible that mechanisms may be developed which reduce the number of stages between the translator and execution unit, even further reducing string execution overhead.

Although the present invention and its advantages have been described in detail, it should be understood that various changes, substitutions and alterations can be made herein without departing from the spirit and scope of the invention as defined by the appended claims.

We claim:

1. A processing system for executing instructions, including string instructions, within a computing environment, the processing system comprising:

an instruction memory for storing said string instructions;

data memory, for storing data upon which said string instructions operate:

a translator connected to said instruction memory for receiving said string instructions from said instruction memory and for generating a sequence of micro instructions for each of said string instructions, an execution unit connected to said translator, for receiving said sequence of micro instructions from said translator and for executing said micro instructions; and a counter, connected to said translator and to said execution unit for storing a count value associated with the number of times said sequence of micro instructions is to be executed for each of said string instructions for counting said number of times said sequence of micro instructions is executed, and for providing a signal indicative that said counted number of times equals said stored number of times, wherein said sequence of micro instructions generated by said translator contain information indicating that said micro instructions are associated with said string instructions.

2. A processing system for executing instructions including string instructions, within a computing environment, the processing system comprising:

an instruction memory, for storing said string instructions;

data memory, for storing data upon which said string instructions operate;

a translator, connected to said instruction memory, for receiving said string instructions from said instruction memory and for generating a sequence of micro instructions for each of said string instructions;

an execution unit, connected to said translator, for receiving, said sequence of micro instructions from said translator, and for executing said micro instructions; and a counter, connected to said translator and to said execution unit, for storing a count value associated with the number of times said sequence of micro instructions is to be executed for each of said string instructions for counting said number of times said sequence of micro instructions is executed and for providing a signal indicative that said counted number of times equals said stored number of times, wherein said micro instructions comprise a control bit which indicates that said micro instructions are associated with said string instructions.

3. The processing system as recited in claim 1 wherein said execution unit further comprises string detection circuitry, connected to said translator, which detects whether micro instructions generated by said translator are associated with said string instructions.

4. The processing system as recited in claim 3 wherein said execution unit is connected to said signal provided by said counter, and wherein, upon receipt of said signal from said counter, does not execute subsequent micro instructions which are detected to be said micro instructions until said signal changes.

5. The processing system as recited in claim 4 wherein said execution unit turns said subsequent micro instructions associated with said string instructions into NOPs (no operation instructions).

6. A microprocessor for executing instructions, including macro string instructions the microprocessor comprising;
- an instruction cache, for storing instructions including said macro string instructions;
- a translator, connected to said instruction cache, for receiving said macro string instructions, and for translating each of said macro string instructions into a micro instruction sequence;
- a register file, connected to said translator, for storing addresses of data upon which said micro instruction sequence operates;
- an execution unit, connected to said translator and to said register file, for executing said micro instruction sequence; and
- a counter connected to said translator, and to said execution unit, for storing a count value associated with the number of times said micro instruction sequence is to be executed for counting said number of times said sequence is executed, and for providing a signal indicative that said counted number of times equals said stored number of times;
- wherein micro instructions within said sequence contain control information for indicating that said micro instructions are associated with said macro string instructions.

7. The microprocessor as recited in claim 6 wherein said execution unit further comprises string detection circuitry for reading said control information, and for determining whether said micro instructions are associated with said macro string instructions.

8. The microprocessor as recited in claim 7 wherein said execution unit is connected to said indicative signal provided by said counter, and wherein, upon receipt of said signal from said counter, turns subsequent micro instructions associated with said macro string instructions into NOPs (no operation instructions) until said indicative signal changes.

9. A method for executing a repetitive string instruction in a processing environment having a translator and an execution unit, the method comprising:
- translating the repetitive string instruction into a micro instruction sequence;
- storing a count value indicative of the number of times said micro instruction sequence is to be executed;
- repetitively generating said micro instruction sequence;
- executing said repetitively generated micro instruction sequence;
- counting the number of times said micro instruction sequence is executed; and when the counted number of times equals the stored number of times stopping execution of a subsequent repetitively generated micro instruction sequence, said stopping execution further comprising:
    - detecting whether said subsequent repetitively generated micro instruction sequence is associated with said repetitive string instruction.

* * * * *